United States Patent
Niwa

(10) Patent No.: US 8,301,323 B2
(45) Date of Patent: Oct. 30, 2012

(54) NAVIGATION SYSTEM, HYBRID VEHICLE WITH SAME, AND METHOD OF SEARCHING FOR ROUTE FOR HYBRID VEHICLE

(75) Inventor: Toshiaki Niwa, Okazaki (JP)

(73) Assignees: Toyota Jidosha Kabushiki Kaisha, Toyota (JP); Aisin AW Co., Ltd., Anjo (JP)

( * ) Notice: Subject to any disclaimer, the term of this patent is extended or adjusted under 35 U.S.C. 154(b) by 212 days.

(21) Appl. No.: 12/922,998

(22) PCT Filed: Mar. 24, 2009

(86) PCT No.: PCT/JP2009/055748
§ 371 (c)(1),
(2), (4) Date: Sep. 16, 2010

(87) PCT Pub. No.: WO2009/122951
PCT Pub. Date: Oct. 8, 2009

(65) Prior Publication Data
US 2011/0022259 A1   Jan. 27, 2011

(30) Foreign Application Priority Data
Mar. 31, 2008   (JP) .................................. 2008-091952

(51) Int. Cl.
*B60L 9/00*   (2006.01)
(52) U.S. Cl. ........... 701/22; 701/410; 701/532; 701/533
(58) Field of Classification Search ............... 701/22, 701/123, 410, 411, 424, 425, 521, 532, 533; 903/902–960; 180/65.1–65.8
See application file for complete search history.

(56) References Cited

U.S. PATENT DOCUMENTS

| | | | | |
|---|---|---|---|---|
| 5,815,824 A | * | 9/1998 | Saga et al. ...................... | 701/22 |
| 5,892,346 A | * | 4/1999 | Moroto et al. ................ | 318/587 |
| 7,251,560 B2 | | 7/2007 | Ogasawara et al. | |
| 2003/0078707 A1 | * | 4/2003 | Shioda et al. ................... | 701/22 |

(Continued)

FOREIGN PATENT DOCUMENTS
DE   198 07 291 A1   8/1999
(Continued)

OTHER PUBLICATIONS
International Search Report in International Application No. PCT/JP2009/055748, dated Jun. 2, 2009.
(Continued)

*Primary Examiner* — Khoi Tran
*Assistant Examiner* — Spencer Patton
(74) *Attorney, Agent, or Firm* — Oliff & Berridge, PLC

(57) ABSTRACT

When passage through a road pricing area where an exhaust gas emission vehicle is subjected to billing is predicted, ECU acquires a current SOC of a power storage device, and estimates a required energy quantity for passing through the road pricing area where an exhaust gas emission vehicle is subjected to billing by EV traveling. Further, a determination is made whether or not the vehicle can pass through the road pricing area by EV traveling based on the current SOC and the required energy quantity as estimated. When a determination is made that the vehicle cannot pass through the road pricing area by EV traveling, ECU executes steps of guiding a route to an adjacent charging station and/or steps of guiding a bypass.

10 Claims, 5 Drawing Sheets

U.S. PATENT DOCUMENTS

2006/0129315 A1 6/2006 Kanematsu
2008/0071472 A1 3/2008 Yamada

FOREIGN PATENT DOCUMENTS

| | | |
|---|---|---|
| EP | 1 297 982 A2 | 4/2003 |
| EP | 1 842 757 A1 | 10/2007 |
| JP | A-07-107617 | 4/1995 |
| JP | A-08-240435 | 9/1996 |
| JP | A-10-170293 | 6/1998 |
| JP | A-2000-266562 | 9/2000 |
| JP | A-2002-310695 | 10/2002 |
| JP | A-2003-111208 | 4/2003 |
| JP | A-2003-294463 | 10/2003 |
| JP | A-2005-274213 | 10/2005 |
| JP | A-2006-153559 | 6/2006 |
| JP | A-2008-070326 | 3/2008 |

OTHER PUBLICATIONS

European Search Report in International Application No. PCT/JP2009/055748, dated Jan. 20, 2012.

* cited by examiner

NAVIGATION SYSTEM, HYBRID VEHICLE WITH SAME, AND METHOD OF SEARCHING FOR ROUTE FOR HYBRID VEHICLE

TECHNICAL FIELD

The present invention relates to a navigation system, a hybrid vehicle with the same, and a method of searching for a route for the hybrid vehicle, and more particularly to route guidance when a hybrid vehicle that allows for selection of a traveling mode with an engine stopped approaches an area regulated by road pricing.

BACKGROUND ART

Road pricing has been proposed that bills vehicles traveling in a certain target region in order to relieve traffic congestion and reduce air pollution. For example, Japanese Patent Laying-Open No. 2005-274213 (Patent Document 1) describes a navigation system that executes route setting in consideration of an area regulated by road pricing (hereinafter referred to as a road pricing area).

Particularly, in the navigation system of Patent Document 1, in route setting, if an area used for route calculation includes a road pricing area, a determination is made whether entrance into the road pricing area is permitted or not based on permission information (a road pricing area under entrance permission and its permission period), and then a route is set which avoids a road pricing area having been determined that entrance thereto is not permitted. Accordingly, route calculation can be automatically executed avoiding such a situation that a vehicle will be billed for passage through the road pricing area with an area license invalidated.

Japanese Patent Laying-Open No. 7-107617 (Patent Document 2) describes a hybrid vehicle that, when traveling along a determined traveling route, allows for traveling in a traveling mode in accordance with a traveling environment, specifically, a motor mode of traveling with a motor alone using a battery as a power source without using the driving force of an engine.

Particularly, the hybrid vehicle described in Patent Document 2, when a driver selects a partial-area zero emission mode in accordance with driver's mode selection, travels in a densely populated area or a gas regulated area with the motor mode applied. When the driver selects a total zero emission mode, a total traveling distance is calculated from a traveling route retrieved as a result of route searching, and a determination is made whether or not the vehicle can travel the total traveling distance in the motor mode depending on the current battery state of charge, so that the necessity for charging is determined. Further, it is described that, when charging is necessary, a determination is made whether or not there is a charging station on the traveling route, and when there is a charging station, the driver receives an inquiry by an audio output or a display about whether or not he/she intends to charge the battery.

Furthermore, Japanese Patent Laying-Open No. 10-170293 (Patent Document 3) describes a route searching device for an electric vehicle for searching for an optimum leading route to a destination in consideration of the charge of the electric vehicle. Particularly, the configuration described in Patent Document 3 searches for a leading route to a destination in consideration of the charge of an on-vehicle battery, based on road map data containing information on charging stations.

Patent Document 1: Japanese Patent Laying-Open No. 2005-274213

Patent Document 2: Japanese Patent Laying-Open No. 7-107617

Patent Document 3: Japanese Patent Laying-Open No. 10-170293

DISCLOSURE OF THE INVENTION

Problems to be Solved by the Invention

As a mode of road pricing, particularly when considering the influence upon air pollution, a regulation is assumed by which an exhaust gas emission vehicle is subjected to billing, that is, a so-called zero emission vehicle is not subjected to billing. In the case of such a regulation, not only an electric vehicle using electric power alone as motive power, but also a hybrid vehicle capable of traveling using a motor output alone with an internal combustion engine stopped (hereinafter also referred to as EV (Electric Vehicle) traveling) is allowed to pass through a road pricing area without being billed provided that the EV traveling is performed.

However, when the hybrid vehicle, also capable of traveling using the internal combustion engine alone or using both of outputs from the internal combustion engine and motor, enters a road pricing area with EV traveling being impossible, the vehicle may be billed in some cases contrary to a user's intention.

Accordingly, a system of determining whether or not the vehicle can pass through a road pricing area only based on permission information (a road pricing area under entrance permission and its permission period) previously set in a fixed manner without considering the current vehicle state, such as the navigation system described in Patent Document 1, may be unable to offer appropriate route guidance (navigation) on the above-described road pricing area. In addition, neither of Patent Documents 2 and 3 considers the above-described road pricing area.

Since a configuration is also known in which a hybrid vehicle is equipped with a charging device configured to be rechargeable by an external charging facility such as a charging station (also referred to as external charging), offering route guidance also considering this point is expected.

The present invention was made to solve the above-described problems, and an object of the present invention is to offer appropriate route guidance for a hybrid vehicle including an internal combustion engine and a motor that outputs a vehicle driving force using electric power from a power storage device, in relation to traveling through a road pricing area where an exhaust gas emission vehicle is subjected to billing.

Means for Solving the Problems

A navigation system according to the present invention is a navigation system for a hybrid vehicle including an internal combustion engine and a motor that outputs a vehicle driving force using electric power from a power storage device. The navigation system includes a prediction unit, an acquisition unit, an estimation unit, a determination unit, and a search unit. The prediction unit is configured to predict in advance whether the hybrid vehicle will pass through a certain regulated area where vehicle traveling using the engine is subjected to billing, based on vehicle position information and road map information. The acquisition unit is configured to acquire a current state of charge of the power storage device when passage through the regulated area is predicted. The estimation unit is configured to estimate a required energy quantity required to be output from the power storage device for passing through the regulated area in an electric traveling mode of traveling using the vehicle driving force from the motor with the engine stopped, when passage through the regulated area is predicted. The determination unit is configured to determine whether or not the hybrid vehicle can pass through the regulated area in the electric traveling mode, based on an estimated value of the required energy quantity estimated by the estimation unit and the current state of charge of the power storage device. The search unit is configured to execute route searching for avoiding billing in response to a determination by the determination unit that the hybrid vehicle cannot pass through the regulated area in the electric traveling mode.

The present invention is also directed to a method of searching for a route for a hybrid vehicle including the above-described internal combustion engine, the above-described power storage device, and the above-described motor. The method includes a step of predicting in advance whether the hybrid vehicle will pass through a certain regulated area where vehicle traveling using the internal combustion engine is subjected to billing, based on vehicle position information and road map information, a step of acquiring a current state of charge of the power storage device when passage through the regulated area is predicted, a step of estimating a required energy quantity required to be output from the power storage device for passing through the regulated area in an electric traveling mode of traveling using the vehicle driving force from the motor with the internal combustion engine stopped when passage through the regulated area is predicted, a step of determining whether or not the hybrid vehicle can pass through the regulated area in the electric traveling mode, based on an estimated value of the required energy quantity estimated by the step of estimating and the current state of charge of the power storage device, and a step of executing route searching for avoiding billing in response to a determination by the step of determining that the hybrid vehicle cannot pass through the regulated area in the electric traveling mode.

According to the above-described navigation system, the hybrid vehicle with the same, and the method of searching for a route for the hybrid vehicle, when passage through a certain regulated area (road pricing area) where vehicle traveling using the engine is subjected to billing is predicted, a determination can be appropriately made whether or not the vehicle can pass through the road pricing area in the electric traveling mode (EV traveling) without being billed, based on the current state of charge of the on-vehicle power storage device. Further, when a determination is made that the hybrid vehicle cannot pass through the regulated area by EV traveling, route searching for avoiding billing is newly executed, so that appropriate route guidance can be offered for traveling in the road pricing area where an exhaust gas emission vehicle is subjected to billing.

Preferably, the power storage device is configured to be rechargeable by a charging facility external to the hybrid vehicle, and the road map information contains information on the charging facility. The search unit or the step of executing searches for a route to an adjacent charging facility relative to a current position of the hybrid vehicle, as the route searching for avoiding billing.

Accordingly, route guidance that can avoid billing in the road pricing area can be offered by guiding a traveling route to a charging facility (charging station) for externally charging the energy deficit for passing through the road pricing area by EV traveling.

More preferably, the navigation system further includes an energy deficit calculation unit, a charge time calculation unit, and a guiding unit. The energy deficit calculation unit is configured to calculate an energy deficit of the power storage device based on the estimated value of the required energy quantity estimated by the estimation unit and the state of charge of the power storage device, when the determination unit determines that the hybrid vehicle cannot pass through the regulated area in the electric traveling mode. The charge time calculation unit is configured to calculate a charge required time for the energy deficit at the adjacent charging facility, based on the energy deficit as calculated and the road map information. The guiding unit is configured to offer guidance on a traveling route to the adjacent charging facility retrieved by the search unit to a driver, when the charge required time as calculated is shorter than a predetermined time that can be set by a user. The method of searching for a route further includes a step of calculating an energy deficit of the power storage device based on the estimated value of the required energy quantity estimated by the step of estimating and the state of charge of the power storage device when the step of determining determines that the hybrid vehicle cannot pass through the regulated area in the electric traveling mode, a step of calculating a charge required time for the energy deficit at the adjacent charging facility based on the energy deficit as calculated and the road map information, and a step of offering guidance on a traveling route to the adjacent charging facility retrieved by the step of executing to a driver when the charge required time as calculated is shorter than a predetermined time that can be set by a user.

Accordingly, a selection can be made between execution and non-execution of route guidance on a charging facility in accordance with the charge required time for the energy deficit relative to the current state of charge of the on-vehicle power storage device. Particularly since route guidance on a charging facility where a charge required time is shorter than a predetermined time that can be set by a user is selectively offered, the convenience can be improved.

More preferably, the search unit searches for a bypass for bypassing the regulated area based on the road map information, as the route searching for avoiding billing. The navigation system further includes a guiding unit for offering guidance on the bypass retrieved by the search unit to the driver when a traveling required time of the bypass is shorter than a predetermined time that can be set by a user. The step of executing searches for a bypass for bypassing the regulated area based on the road map information, as the route searching for avoiding billing. The method of searching for a route further includes a step of offering guidance on the bypass retrieved by the step of executing to a driver, when a traveling required time of the bypass is shorter than a predetermined time that can be set by a user.

Accordingly, a bypass for a road pricing area where the traveling required time is shorter than or equal to a predetermined time can be automatically guided. Particularly since a bypass where the required traveling time is shorter than a predetermined time that can be set by the user is selectively guided, the convenience can be improved.

Still more preferably, the power storage device is configured to be rechargeable by a charging facility external to the hybrid vehicle, and the road map information is configured to contain information on the charging facility. The search unit searches for a route to an adjacent charging facility relative to a current position of the hybrid vehicle, as the route searching for avoiding billing, when the guidance on the bypass by the guiding unit is not executed. The navigation system further includes an energy deficit calculation unit calculating an energy deficit of the power storage device based on the estimated value of the required energy quantity estimated by the estimation unit and the state of charge of the power storage device, and a charge time calculation unit calculating a charge required time for the energy deficit at the adjacent charging facility, based on the energy deficit as calculated and the road map information. The guiding unit offers guidance on the route to the adjacent charging facility retrieved by the search unit to the driver, when the charge required time as calculated by the charge time calculation unit is shorter than a predetermined time that can be set by the user.

Accordingly, when there is no appropriate bypass that can be guided, a traveling route to a charging facility (charging station) for externally charging the energy deficit for passing through the road pricing area by EV traveling can be automatically guided. Particularly since only route guidance on a charging facility where the charge required time is shorter than a predetermined time that can be set by the user is offered, the convenience can be improved.

Still more preferably, the search unit searches for a bypass for bypassing the regulated area based on the road map information, as the route searching for avoiding billing, when the guidance on the traveling route to the adjacent charging facility by the guiding unit is not executed. The guiding unit offers guidance on the bypass retrieved by the search unit to the driver, when the traveling required time of the bypass is shorter than a predetermined time that can be set by the user.

Accordingly, when there is no appropriate adjacent charging facility that can be guided, a bypass for a road pricing area where the traveling required time is shorter than or equal to a predetermined time can be automatically guided. Particularly since only a bypass where the required traveling time is shorter than a predetermined time that can be set by the user is guided, the convenience can be improved.

Preferably, in the navigation system, when an amount billed by passage through the regulated area is lower than a predetermined amount that can be set by a user, route guidance in accordance with the route searching for avoiding billing is not executed. The method of searching for a route further includes a step of not executing route guidance in accordance with the route searching for avoiding billing, when an amount billed by passage through the regulated area is lower than a predetermined amount that can be set by the user.

Accordingly, route guidance for avoiding billing in the road pricing area can be automatically unexecuted in accordance with an amount billed in the road pricing area.

More preferably, the prediction unit predicts whether the hybrid vehicle will pass through the regulated area, based on a result of searching for a route to a destination previously set. Alternatively, during vehicle traveling with no destination set, the prediction unit predicts whether the hybrid vehicle will pass through the regulated area, based on the vehicle position information and a past traveling history.

Accordingly, whether the hybrid vehicle will pass through the certain regulated area (road pricing area) can be predicted in advance whether route guidance on a destination has been or has not been executed.

A hybrid vehicle according to the present invention includes the power storage device, the motor, the internal combustion engine, any one of the above-described navigation systems, and a traveling controller preferentially selecting the electric traveling mode during traveling in the regulated area.

Effects of the Invention

According to the present invention, appropriate route guidance can be offered to a hybrid vehicle including an internal combustion engine and a motor that outputs a vehicle driving force using electric power from a power storage device, in relation to traveling in a road pricing area where an exhaust gas emission vehicle is subjected to billing.

Figure 1:
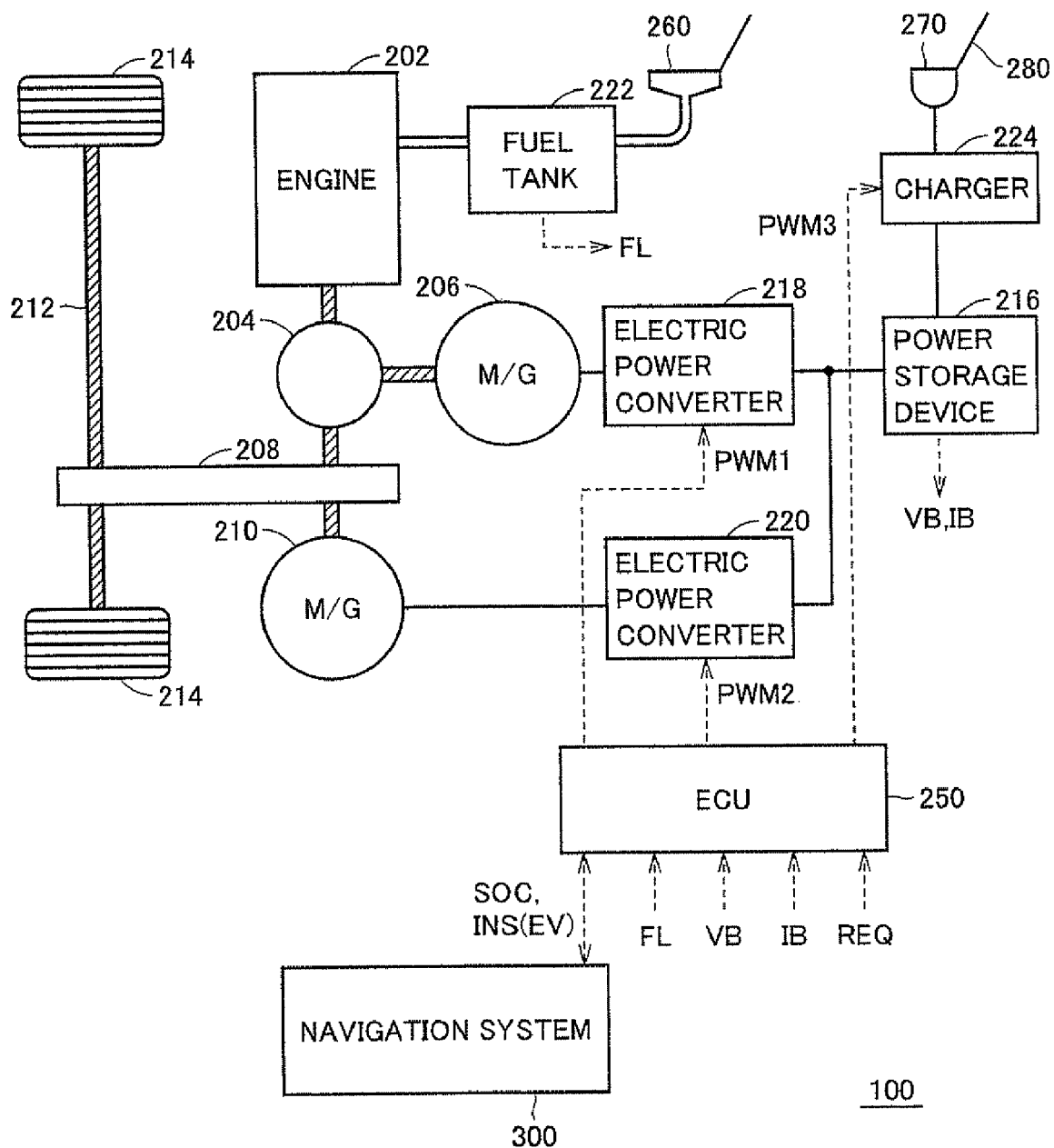
FIG. 1 is a functional block diagram illustrating a configuration example of a hybrid vehicle equipped with a navigation system according to an embodiment of the present invention.

DESCRIPTION OF THE REFERENCE SIGNS 100 hybrid vehicle; 142 accelerator position sensor; 144 vehicular speed sensor; 202 engine; 204 power split mechanism; 206, 210 motor generators; 208 transmission gear; 212 driving shaft; 214 wheel; 216 power storage device; 218, 220 electric power converters; 222 fuel tank; 224 charger; 250 ECU; 260 fuel supply port; 270 charging connector; 280 feeder cable; 300 navigation system; 310 navigation controller; 320 GPS antenna; 330 beacon receiving unit; 340 gyro sensor; 350 display unit; 355 recording medium; 360 interface unit; 370 storage portion; 400 passage/nonpassage prediction unit; 410 required energy estimation unit; 420 SOC acquisition unit; 430 determination unit; 440 energy deficit calculation unit; 450 charge required time calculation unit; 455 bypass required time calculation unit; 460, 460A route search units; 470 guiding unit; FLP prediction flag (passage of road pricing area); FNEV flag; IB input/output current (power storage device); PWM1, PWM2, PWM3 signals (power conversion); Rbp bypass information; Rst route information (charging station); Tbp bypass time; Tch charge required time; Tth1 threshold value (charge required time); Tth2 threshold value (bypass time); Wev required energy quantity (EV traveling); Wst stored energy quantity; ΔW energy deficit

BEST MODES FOR CARRYING OUT THE INVENTION

Embodiments of the present invention will be described below with reference to the drawings. In the following description, the same or corresponding parts are given the same reference numerals, and a detailed description thereof will not be repeated in principle.

FIG. 1 is a functional block diagram illustrating a configuration example of a hybrid vehicle equipped with a navigation system according to an embodiment of the present invention.

Referring to FIG. 1, a hybrid vehicle 100 includes an engine 202, a power split mechanism 204, motor generators 206, 210, a transmission gear 208, a driving shaft 212, and wheels 214. Moreover, hybrid vehicle 100 further includes power storage device 216, electric power converters 218, 220, a fuel tank 222, a charger 224, an ECU (Electronic Control Unit) 250, a fuel supply port 260, a charging connector 270, and a navigation system 300.

Power split mechanism 204 is coupled to engine 202, motor generator 206, and transmission gear 208 to split power among them. For example, a planetary gear having three rotary shafts of a sun gear, a planetary carrier, and a ring gear can be used as power split mechanism 204, and these three rotary shafts are connected to rotary shafts of engine 202, motor generator 206, and transmission gear 208, respectively.

Kinetic energy created by engine 202 is distributed between motor generator 206 and transmission gear 208 by power split mechanism 204. That is, engine 202 is incorporated in hybrid vehicle 100 as a power source that drives transmission gear 208 transmitting the power to driving shaft 212, and also drives motor generator 206. Motor generator 206 is incorporated in hybrid vehicle 100 as a component that operates as a generator driven by engine 202, and that operates as a motor capable of starting engine 202. Moreover, motor generator 210 is incorporated in hybrid vehicle 100 as a power source that drives transmission gear 208 transmitting the power to driving shaft 212.

Power storage device 216 is a rechargeable DC power source, and is made of a secondary battery of nickel hydrogen, lithium ion or the like, for example. Power storage device 216 supplies electric power to electric power converters 218 and 220. Moreover, power storage device 216, at the time of a power generation of motor generator(s) 206 and/or 210, receives electric power from electric power converter(s) 218 and/or 220 to be charged.

Furthermore, at the time of the external charge when charging connector 270 is connected to a charging facility (not shown) external to the vehicle represented by a charging station through a feeder cable 280, power storage device 216 is charged by receiving electric power from charger 224, which converts external electric power from the charging facility to the charging power of power storage device 216. It is to be noted that the "charging station" will be illustrated below as a typical example of a charging facility capable of externally charging hybrid vehicle 100.

As power storage device 216, a large-capacitance capacitor can also be employed, and any device may be employed as long as it is an electric power buffer that can temporarily store the generated electric power by motor generators 206, 210 and the electric power from the external electric power source, and can supply the stored electric power to motor generators 206 and 210. An output voltage VB and an input/output current IB of power storage device 216 are detected by sensors not shown, and detected values thereof are sent out to ECU 250.

Electric power converter 218 converts the electric power generated by motor generator 206 to DC power based on a signal PWM1 from ECU 250 for output to power storage device 216. Electric power converter 220 converts DC power supplied from power storage device 216 to AC power based on a signal PWM2 from ECU 250 for output to motor generator 210. When engine 202 is started, electric power converter 218 converts DC power supplied from power storage device 216 to AC power based on signal PWM1 for output to motor generator 206. Moreover, during braking of the vehicle or when acceleration is reduced on a down slope, electric power converter 220 converts electric power generated by motor generator 210 to DC power based on signal PWM2 for output to power storage device 216.

Motor generators 206 and 210 are AC motors, and are each made of, for example, a three-phase AC synchronous motor in which a permanent magnet is buried in a rotor. Motor generator 206 converts kinetic energy created by engine 202 to electric energy for output to electric power converter 218. Moreover, motor generator 206 creates driving force by three-phase AC power received from electric power converter 218 to start engine 202.

Motor generator 210 creates driving torque of the vehicle by three-phase AC power received from electric power converter 220. Moreover, during braking of the vehicle or when acceleration is reduced on a down slope, motor generator 210 converts dynamical energy stored in the vehicle as kinetic energy and potential energy to electric energy for output to electric power converter 220.

Engine 202 converts thermal energy by combustion of a fuel to kinetic energy of moving elements such as a piston, a rotor and the like, and outputs the converted kinetic energy to power split mechanism 204. For example, if the moving element is a piston, and the motion is a reciprocating motion, the reciprocating motion is converted to rotary motion through a so-called crank mechanism, and the kinetic energy of the piston is transmitted to power split mechanism 204. As a fuel of engine 202, a hydrocarbon-based fuel such as gasoline, light oil, ethanol, liquid hydrogen, and natural gas, or a liquid or gas hydrogen fuel is preferable.

Fuel tank 222 stores the fuel supplied through fuel supply port 260, and supplies the stored fuel to engine 202. A fuel remaining quantity FL inside fuel tank 222 is detected by a sensor not shown, and the detected value is output to ECU 250.

Charger 224 converts electric power from the external electric power source provided to charging connector 270 to the charging power of power storage device 216 based on a signal PWM3 from ECU 250 for output to power storage device 216.

ECU 250 executes arithmetic operations based on signals received from the respective sensors as well as a map and a program stored in a storage area of a ROM (Read Only Memory) not shown or the like, to control equipment so as to bring hybrid vehicle 100 into a desired driving state. Alternatively, at least part of ECU 250 may be configured to execute predetermined mathematical/arithmetic operations by hardware such as an electric circuit.

More specifically, ECU 250 generates signals PWM1 and PWM2 for driving electric power converters 218 and 220, and outputs generated signals PWM1 and PWM2 to electric power converters 218 and 220, respectively. Moreover, upon receiving a signal REQ requesting the charge of power storage device 216 by charger 224, ECU 250 generates signal PWM3 for driving charger 224, and outputs generated signal PWM3 to charger 224.

The configuration for the external charge of hybrid vehicle 100 is not limited to the example in FIG. 1, but any configuration can be applied as long as it can convert the electric power from the charging facility (not shown) to the charging power of power storage device 216 during parking. For example, a configuration may be such that provision of charger 224 exclusive to the external charge is omitted, and the electric power from the external electric power source provided to charging connector 270 is converted to the charging power of power storage device 216 by electric power converters 218 and 220.

Furthermore, ECU 250 controls a traveling mode of hybrid vehicle 100. That is, ECU 250 controls the switching between EV traveling (electric traveling mode) using motor generator 210 alone with engine 202 stopped and hybrid traveling (hybrid traveling mode) with engine 202 operated Hereinafter, the electric traveling mode is also referred to as "EV mode", and the hybrid traveling mode is also referred to as "HV mode."

Moreover, ECU 250 can also generate and manage information on the traveling using the electric power and information on fuel efficiency, based on a fuel remaining quantity FL of fuel tank 222 and the respective detected values of voltage VB and current IB of power storage device 216, and alternatively, further based on another type of information not shown, and can display the information on a display not shown or the like. ECU 250 and navigation system 300 exchange the SOC of power storage device 216, a signal INS (EV) instructing preferential selection of the EV traveling, and the like, as will be described later.

Figure 2:
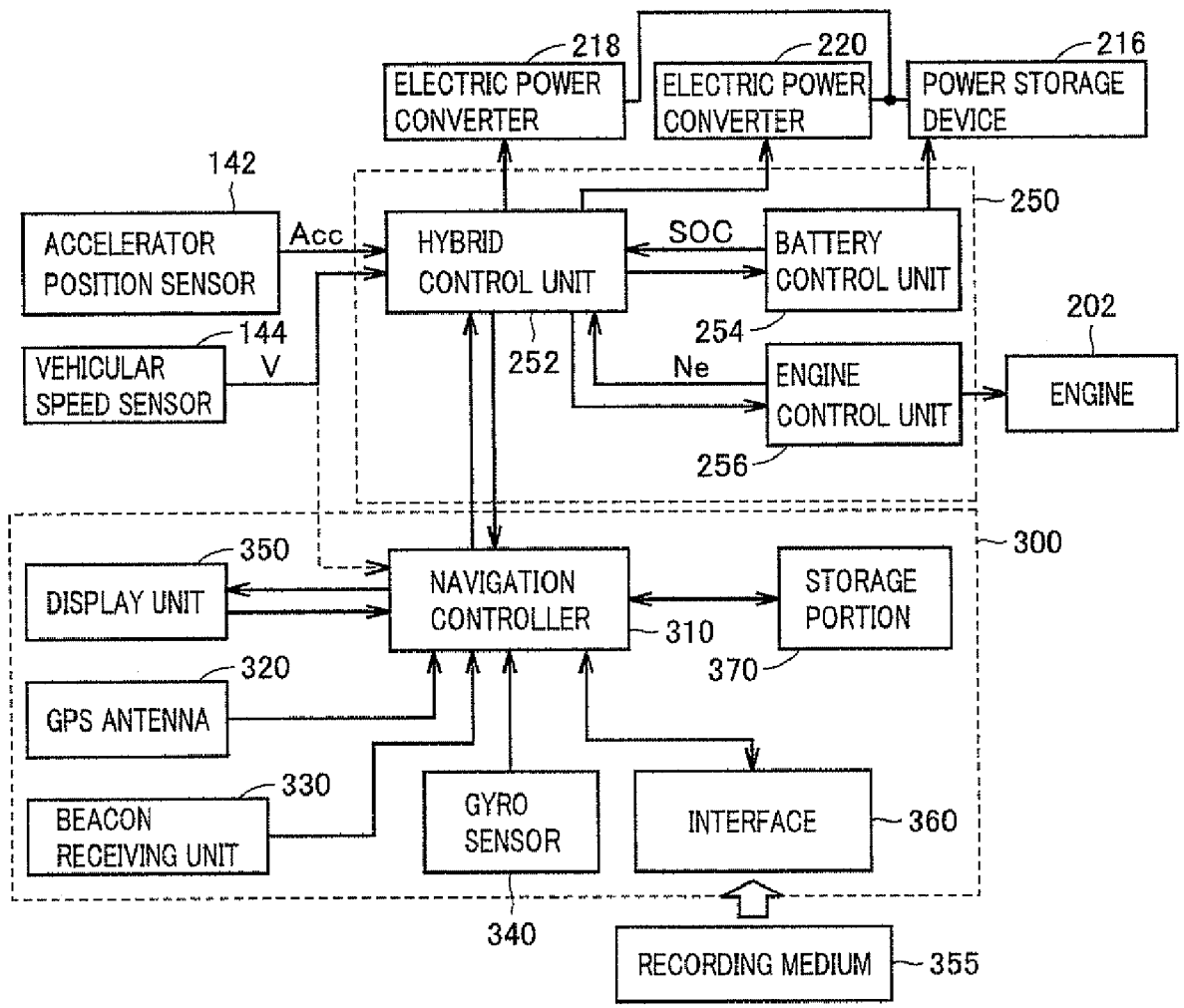
FIG. 2 is a block diagram illustrating a vehicle control configuration in relation to the navigation system according to the embodiment of the present invention.

FIG. 2 is a block diagram illustrating a vehicle control configuration in relation to the navigation system according to the embodiment of the present invention.

Referring to FIG. 2, ECU 250 includes a hybrid control unit 252, a battery control unit 254, and an engine control unit 256. Each of hybrid control unit 252, battery control unit 254, and engine control unit 256 may be implemented by configuring a circuit (hardware) having functions that correspond to the blocks in ECU 250, or may be implemented by ECU 250 executing software operations in accordance with a predetermined program.

Battery control unit 254 acquires a state of charge (SOC) of power storage device 216 such as by integrating charge/discharge currents of power storage device 216 for transmission to hybrid control unit 252. Alternatively, the SOC may be acquired with the output voltage and temperature of power storage device 216 further reflected therein.

Engine control unit 256 performs a throttle control of engine 202, and further, detects an engine speed Ne of engine 202 for transmission to hybrid control unit 252.

Hybrid control unit 252 calculates an output requested by a driver (requested power) based on an output signal Acc from accelerator position sensor 142 and a vehicular speed V detected by a vehicular speed sensor 144. Hybrid control unit 252 calculates a required driving force (total power) in consideration of the state of charge SOC of power storage device 216 in addition to this driver's requested power, and further, calculates a speed requested of the engine and power requested of the engine. In other words, output power sharing between engine 202 and motor generator 210 with respect to the total power is determined. That is, hybrid control unit 252 has the function of "a traveling control unit" selecting between the EV mode (with the engine output set at zero) and the HV traveling mode.

Hybrid control unit 252 transmits the requested speed and the requested power to engine control unit 256 to cause engine control unit 256 to perform the throttle control for engine 202. In the EV mode, hybrid control unit 252 instructs engine control unit 256 to stop engine 202.

Further, hybrid control unit 252 generates control instructions (signals PWM1 and PWM2 shown in FIG. 1) for electric power converters 218 and 220 controlling motor generators 206 and 210, respectively, such that the output power from motor generator 210 conforms to the above-mentioned sharing.

Navigation system 300 includes a navigation controller 310, a GPS antenna 320, a beacon receiving unit 330, a gyro sensor 340, a display unit 350, an interface unit 360, and a storage portion 370.

Navigation controller 310 is typically implemented by an electronic control unit (ECU) and offers route guidance of setting a traveling route to a destination. Typically, navigation controller 310 obtains information on a destination set by a user from display unit 350 including a touch display. It is to be noted that, throughout the present embodiment, any well-known method is applicable to the method of searching for a traveling route to the destination having been set once, which will not be described in detail.

Navigation controller 310 reads road map data recorded on a recording medium 355 such as a CD (Compact Disk), DVD (Digital Versatile Disk) and the like through interface unit 360. It is to be noted that the road map data preferably contains information on charging facilities (charging stations) for externally charging hybrid vehicle 100, for example, information indicating their positions and charging capabilities (particularly, charging speeds). Storage portion 370 is an HDD (Hard Disk Drive), for example, and can store the road map data in a nonvolatile manner. It is to be noted that storage portion 370 may not be provided.

Navigation controller 310 receives information from beacons installed on the road having been received by beacon receiving unit 330. For example, the information from beacons allows acquisition of traffic congestion information, required time, construction information, speed/lane regulation information, information on parking lots and vacant space, and the like, and also allows identification of approach to a road pricing area. Alternatively, information indicating road pricing areas may be previously stored in the above-mentioned road map data.

Navigation controller 310 grasps vehicle position information, that is, a current position and a traveling direction of the vehicle using GPS antenna 320 and gyro sensor 340, or alternatively further using output V from vehicular speed sensor 144. Navigation controller 310 then displays the grasped vehicle position on display unit 350 in a manner overlapping the road map data. Further, when a destination is set by the user, navigation controller 310 searches for a traveling route from the current position to the destination, and offers route guidance on display unit 350. As is well known, audio guidance may be offered as part of the route guidance, based on the relation between the vehicle position and the retrieved traveling route.

Navigation controller 310 outputs signal INS (EV) to hybrid control unit 252 instructing a preferential selection of the EV mode while hybrid vehicle 100 is passing through a road pricing area. Upon receipt of signal INS (EV), hybrid control unit 252 selects the EV mode unless the SOC of power storage device 216 reaches a manageable lower limit.

Figure 3:
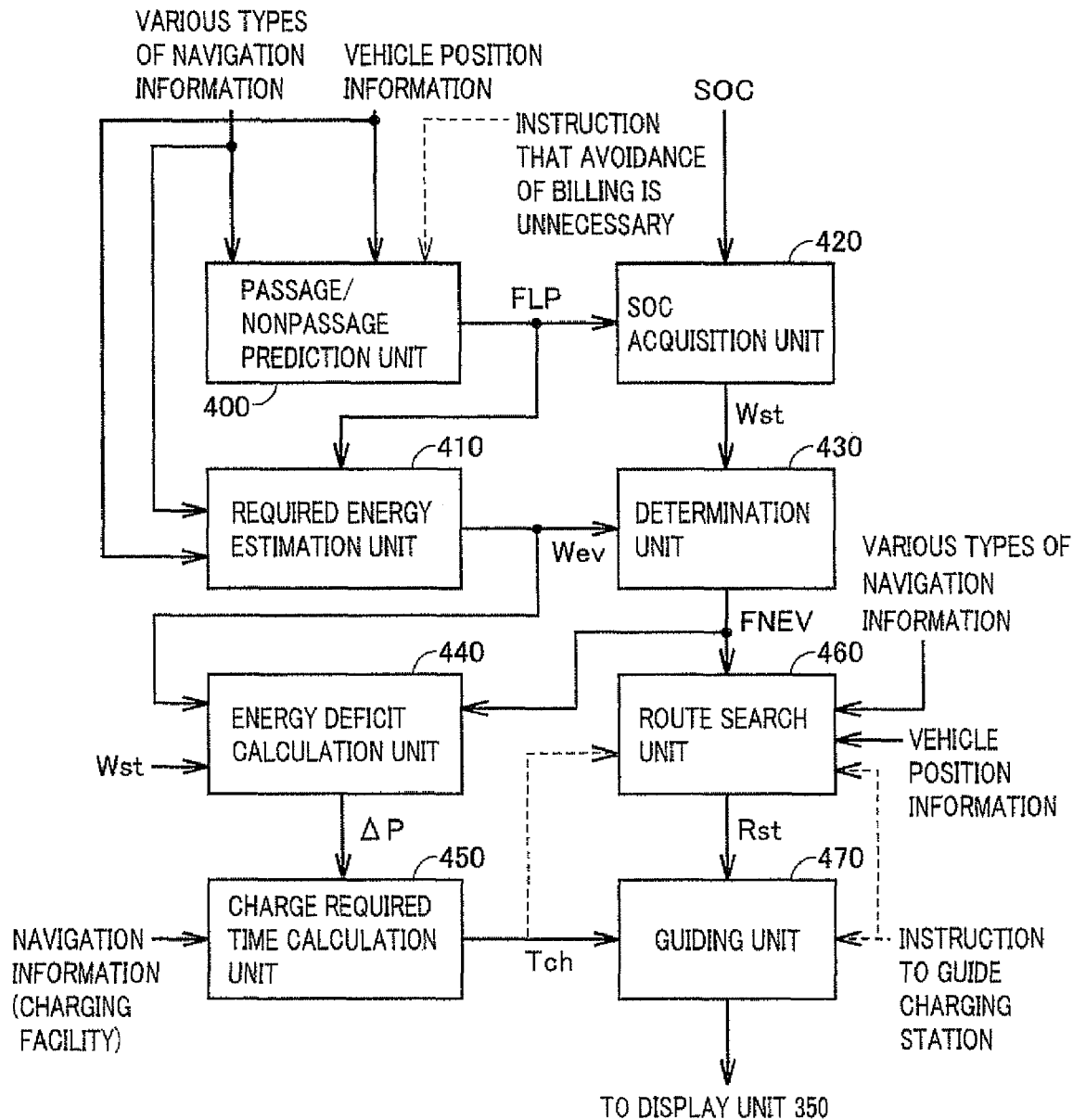
FIG. 3 is a functional block diagram illustrating a first example of route guidance control by the navigation system according to the embodiment of the present invention.

FIG. 3 is a functional block diagram illustrating a first example of route guidance control by the navigation system according to the embodiment of the present invention. Each block in the functional block diagrams which will be described hereinbelow is typically implemented by a software operation achieved by ECU constituting navigation controller 310 executing a predetermined program, but may be implemented by configuring the ECU to include a circuit (hardware) having the function corresponding to the block.

With reference to FIG. 3, a passage/nonpassage prediction unit 400 predicts in advance whether hybrid vehicle 100 will pass through a road pricing area where an exhaust gas emission vehicle is subjected to billing, that is, a zero emission vehicle is not subjected to billing, based on various types of navigation information including rod map data and information from beacons as well as vehicle position information. When passage through a road pricing area is predicted, a prediction flag FLP is turned "on" to instruct to execute route searching as will be described below.

For example, when searching for a route to a destination set by the user including a driver has been executed, passage/nonpassage prediction unit 400 can predict whether or not the vehicle will pass through a road pricing area based on whether a retrieved traveling route includes the road pricing area. In this case, when the distance to the border of the road pricing area is shorter than or equal to a predetermined distance based on the vehicle position information and traveling direction grasped by GPS antenna 320 and the like, prediction flag FLP may be turned on.

Even when a destination has not been set, whether the vehicle will pass through the road pricing area can be predicted based on the vehicle position information and traveling direction grasped by GPS antenna 320 and the like, preferably further reflecting past traveling histories. When the distance to the border of the road pricing area is shorter than or equal to a predetermined distance (which may have a different value from that in setting the destination), prediction flag FLP can then be turned on.

Alternatively, a configuration may be adopted in which whether or not route guidance in consideration of billing by road pricing is necessary can be previously input as one of user's setting items. Still alternatively, the upper limit of amount billed at which route guidance is unnecessary may be set by a user, and whether or not route guidance is necessary may be automatically determined by a comparison between an amount billed in the road pricing area, passage of which has been predicted, and the upper limit. When the user has instructed that avoidance of billing is unnecessary, or when it is automatically determined that route guidance is unnecessary based on the amount billed, passage/nonpassage prediction unit 400 maintains prediction flag FLP at off which is an initial value, irrespective of the above-described prediction determination.

When prediction flag FLP is turned on, SOC acquisition unit 420 acquires the SOC indicating the state of charge of power storage device 216 from hybrid control unit 252, and calculates a stored energy quantity Wst available for the EV traveling based on the acquired SOC.

In response to the turning on of prediction flag FLP, required energy estimation unit 410 estimates an energy quantity required for passing through the road pricing area by EV traveling, based on the navigation information. More specifically, required energy estimation unit 410 estimates a route passing through the road pricing area, and also calculates a required energy quantity Wev for passing through the road pricing area by EV traveling based on the distance of the predicted route, required time, and route information (gradient, etc.)

Determination unit 430 compares stored energy quantity Wst based on the state of charge of power storage device 216 and required energy quantity Wev estimated by required energy estimation unit 410 to determine whether or not the vehicle can pass through the road pricing area by EV traveling with the current stored energy of power storage device 216. More specifically, when Wev>Wst holds, determination unit 430 turns on flag FNEV indicating that the vehicle cannot pass through the road pricing area by EV traveling, and otherwise turns off flag FNEV.

When flag FNEV is turned on, a route search unit 460 executes route searching for external charge before entering the road pricing area. For example, based on the vehicle position information and rod map information, route search unit 460 outputs route information Rst on a charging station adjacent to the current position of hybrid vehicle 100. At this stage, the "adjacent charging station" to be a destination in route searching will be hereinafter also referred to as "the nearest charging station" as it is typically the charging station closest to the current position. It is to be noted that a plurality of charging stations having different charging speeds (i.e., charge required times) may be "adjacent charging stations (the nearest charging stations)".

Further, in response to the turning on of flag FNEV, an energy deficit calculation unit 440 calculates an energy deficit $\Delta W$ ($\Delta W = Wev - Wst$) corresponding to a deficit of stored energy quantity Wst relative to required energy quantity Wev.

Charge required time calculation unit 450 then calculates a required time Tch required for external charge of energy deficit $\Delta W$ at the nearest charging station, based on energy deficit $\Delta W$ calculated by energy deficit calculation unit 440 and the charging speed at the nearest charging station obtained from road map data.

Guiding unit 470 outputs a display in accordance with route information Rst from route search unit 460 to display unit 350, based on charge required time Tch calculated by charge required time calculation unit 450 or in response to an instruction input from the user of the vehicle. That is, guidance on a traveling route to the nearest charging station is offered to the user of the hybrid vehicle.

For example, guiding unit 470 can automatically output a guidance display in accordance with route information Rst to display unit 350 when charge required time Tch is shorter than a threshold value previously set by the user. Alternatively, guiding unit 470 can output a guidance display in accordance with route information Rst to display unit 350 in response to an instruction from the user of the hybrid vehicle to guide a charging station. It is to be noted that, when receiving the user's instruction for guidance, the required time to the nearest charging facility corresponding to a destination in route information Rst and a charge required time for the energy deficit may be presented in advance.

Still alternatively, in response to satisfaction of the conditions for charge required time Tch or the user's instruction to guide a charging station, guiding unit 470 may unconditionally output a display in accordance with route information Rat from route search unit 460 to display unit 350, as the configuration that route search unit 460 searches for a traveling route to the nearest charging station.

As described above, according to the route guidance control shown in FIG. 3, when passage through a road pricing area where vehicle traveling using the engine is subjected to billing is estimated, a determination can be appropriately made whether or not the vehicle can pass through the road pricing area by EV traveling without being billed, based on the current state of charge of power storage device 216. Further, when passage by EV traveling is impossible, route guidance on a charging facility (charging station) for charging an energy deficit can be offered before passing through the road pricing area.

Figure 4:
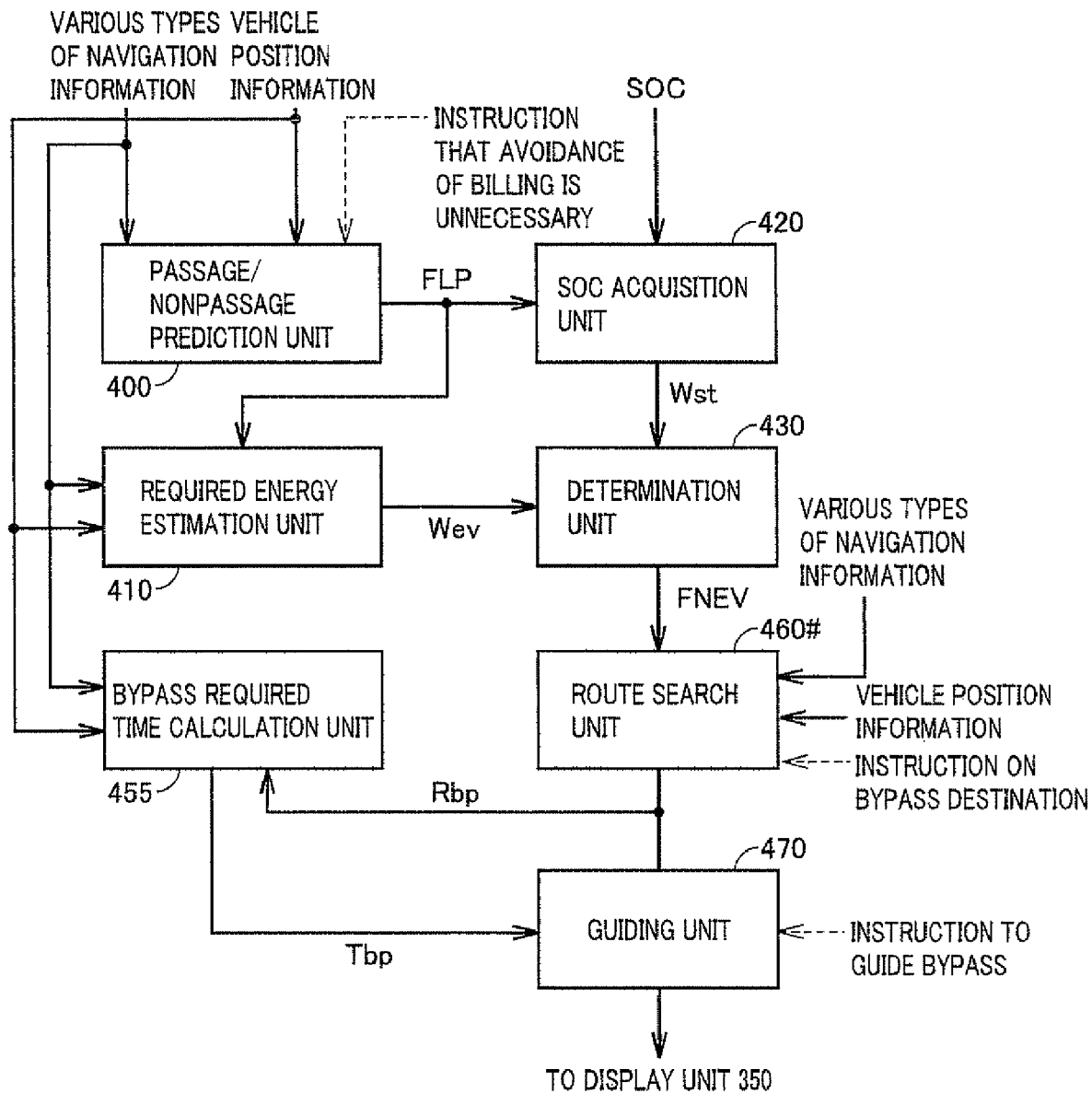
FIG. 4 is a functional block diagram illustrating a second example of route guidance control by the navigation system according to the embodiment of the present invention.

FIG. 4 shows a second example of route guidance control by the navigation system according to the embodiment of the present invention. FIG. 4 shows a control configuration for newly searching for a bypass for a road pricing area when passage by EV traveling is impossible.

In the second example shown in FIG. 4 as compared to the first example shown in FIG. 3, a bypass required time calculation unit 455 is provided instead of energy deficit calculation unit 440 and charge required time calculation unit 450. Further, a route search unit 460# is provided instead of route search unit 460.

Passage/nonpassage prediction unit 400, required energy estimation unit 410, SOC acquisition unit 420, and determination unit 430 are identical in function to those of FIG. 3. In other words, similarly to the case of FIG. 3, a determination is made whether or not the vehicle can pass through a road pricing area by EV traveling without being billed based on the current state of charge of power storage device 216. When passage by EV traveling is impossible, flag FNEV is turned on.

When flag FNEV is turned on, route search unit 460# executes route searching for bypassing the road pricing area. For example, route search unit 460# outputs bypass information Rbp based on the vehicle position information and road map information. At this stage, a plurality of candidates for the bypass may be presented.

It is to be noted that when searching for a route to a destination has been executed, a bypass for returning to this route without passing through the road pricing area is searched for. In contrast, during traveling with no destination set, the vehicle user may be requested to set a tentative destination (bypass destination) corresponding to a destination passing through the road pricing area, when searching for a bypass.

Then, bypass required time calculation unit 455 calculates a bypass time Tbp corresponding to the time required for traveling along the bypass set by route search unit 460#, based on bypass information Rbp and navigation information (road map information, beacon information, etc.)

Guiding unit 470 outputs a display in accordance with bypass information Rbp from route search unit 460# to display unit 350, based on bypass time Tbp calculated by bypass required time calculation unit 455 or in response to an instruction input from the user of the vehicle. That is, guidance on a bypass for the road pricing area is offered to the user of the hybrid vehicle.

For example, guiding unit 470 can automatically output a guidance display in accordance with bypass information Rbp to display unit 350 when bypass time Tbp is shorter than a threshold value previously set by the user. Alternatively, guiding unit 470 can output a guidance display in accordance with bypass information Rbp to display unit 350 in response to an instruction from the user of the hybrid vehicle to guide a bypass. It is to be noted that, when receiving the user's instruction for guidance, bypass time Tbp may be presented in advance.

In this manner, according to the route guidance control shown in FIG. 4, similarly to the control configuration shown in FIG. 3, a determination can be appropriately made whether or not the vehicle can pass through the road pricing area by EV traveling without being billed, based on the current state of charge of power storage device 216. Further, when passage by EV traveling is impossible, guidance on a bypass for the road pricing area can be offered.

Furthermore, the route guidance controls shown in FIGS. 3 and 4 may be combined to execute overall route guidance control when predicting whether the vehicle will pass through the road pricing area.

Figure 5:
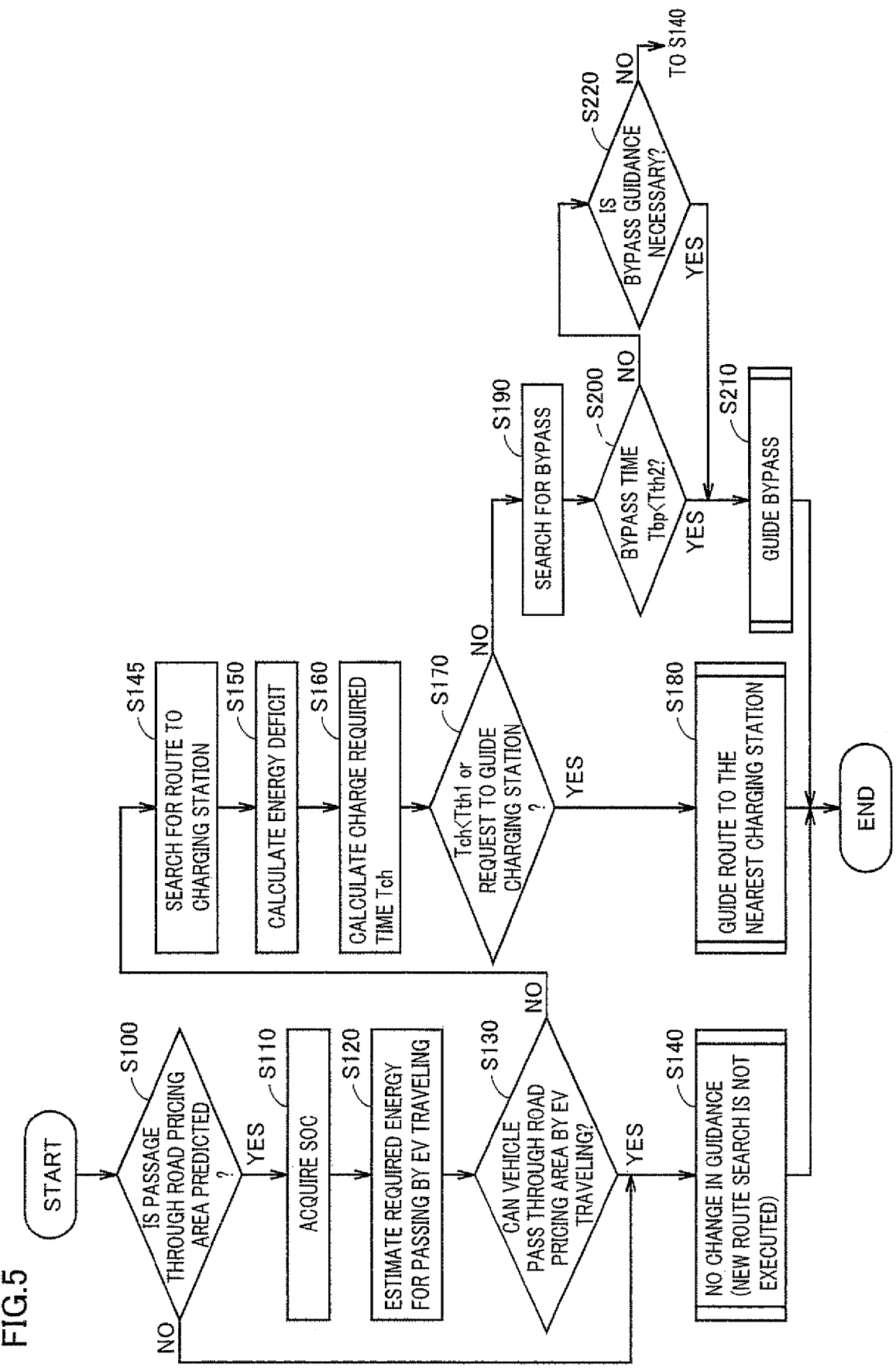
FIG. 5 is a flow chart of a procedure of overall route guidance control by the navigation system according to the embodiment of the present invention.

FIG. 5 is a flow chart of a procedure example of such overall route guidance control. For example, such route guidance control can be implemented by the ECU constituting navigation controller 310 executing a program in accordance with the flow chart shown in FIG. 5.

With reference to FIG. 5, at step S100, navigation controller 310 predicts in advance whether hybrid vehicle 100 will pass through a road pricing area where an exhaust gas emission vehicle is subjected to billing. The determination at step S100 can be executed similarly to the determination executed by passage/nonpassage prediction unit 400 shown in FIGS. 3 and 4. More specifically, a YES determination is made at step S100 by passage/nonpassage prediction unit 400 under the condition that prediction flag FLP is turned on, and otherwise a NO determination is made at step S100.

When passage through the road pricing area is predicted (when the YES determination is made at step S100), navigation controller 310 acquires the current SOC of power storage device 216 at step S110. That is, the operation at step S110 corresponds to the function of SOC acquisition unit 420 shown in FIGS. 3 and 4.

Further, navigation controller 310 advances the process into step S120 to estimate a required energy quantity for passing through the road pricing area by EV traveling. That is, the operation at step S120 corresponds to the function of required energy estimation unit 410 shown in FIGS. 3 and 4.

Furthermore, at step S130, navigation controller 310 determines whether or not the vehicle can pass through the road pricing area by EV traveling, based on the current SOC acquired at step S110 and the required energy quantity estimated at step S120. The operation at step S130 can be executed similarly to the determination made by determination unit 430 shown in FIGS. 3 and 4. More specifically, determination unit 430 makes the NO determination at step S130 under the condition that FNEV is turned on, and otherwise makes the YES determination at step S130.

Then, when the vehicle can pass through the road pricing area by EV traveling (when the YES determination is made at step S130), navigation controller 310 advances the process into step S140. At step S140, new route guidance in response to the prediction of passage through the road pricing area is not executed.

As a result, when searching for a route to a destination has been executed, the current guidance is maintained without change. During traveling with no destination set, route guidance is maintained unexecuted without newly guiding a route to a charging station or a bypass, as will be described later.

When the vehicle cannot pass through the road pricing area by EV traveling (when the NO determination is made at step S130), navigation controller 310 advances the process into step S145 to execute route searching for external charge before entering the road pricing area, similarly to route search unit 460 shown in FIG. 3. For example, a route to the nearest charging station is searched for based on the vehicle position information and road map information. At this stage, the destination may include a plurality of charging stations having different charging speeds (i.e., charge required times).

Further, at step S150, navigation controller 310 calculates energy deficit ΔW corresponding to a deficit of stored energy quantity Wst based on the SOC of power storage device 216 relative to the required energy quantity estimated at step S120. Then, at step S160, navigation controller 310 calculates required time Tch required for external charge of energy deficit ΔW at the nearest charging station. That is, the operation at step S150 corresponds to the function of energy deficit calculation unit 440 shown in FIG. 3, and the operation at step S160 corresponds to the function of charge required time calculation unit 450 shown in FIG. 3.

Then, at step S170, navigation controller 310 determines whether or not to execute route guidance to the nearest charging station. As described with reference to FIG. 3, the determination at step S170 can be made by comparing charge required time Tch and a threshold value Tth1 previously set by the user or in accordance with the presence or absence of a request from the user of the hybrid vehicle to guide a charging station. It is to be noted that, when receiving the user's request for guidance, the required time to the nearest charging facility and the charge required time for the energy deficit may be presented in advance.

When charge required time Tch is shorter than threshold value Tth1 or upon receipt of the user's request to guide a charging station (when the YES determination is made at step S170), navigation controller 310 advances the process into step S180 to offer route guidance on the nearest charging station. That is, the operation at step S180 corresponds to the function of guiding unit 470 shown in FIG. 3. It is to be noted that the procedure may be changed such that step S145 of searching for a route to the nearest charging station is executed when the YES determination is made at step S170.

When the NO determination is made at step S170 so that route guidance on the nearest charging station is not executed, navigation controller 310 advances the process into step S190 to search for a bypass for the road pricing area, similarly to route search unit 460# shown in FIG. 4. At this stage, a plurality of candidates for the bypass may be presented.

Further, navigation controller 310 advances the process into step S200 to determine whether bypass time Tbp which is a required time for the bypass retrieved at step S190 is shorter than a predetermined threshold value Tth2.

When bypass time Tbp is shorter than threshold value Tth2 (when the YES determination is made at step S200), navigation controller 310 advances the process into step S210 to guide a bypass. It is to be noted that when there are a plurality of bypasses that satisfy the relation of Tbp<Tth2, it is preferable to guide one of the bypasses retrieved at step S190 that has the shortest required time, however, guidance on the plurality of bypasses may be offered to the user in a manner to permit user's selection.

When the NO determination is made at step S200, navigation controller 310 advances the process into step S220 to determine whether guidance on a bypass is necessary. The determination at step S220 can be made, for example, in response to the presence or absence of an instruction from the user of the hybrid vehicle to guide a bypass. Preferably, at this stage, the presence or absence of bypass guidance instruction is inquired of the user upon presenting an amount billed in a road pricing area to be bypassed.

Alternatively, the determination at step S220 may be automatically made in accordance with the amount billed in the road pricing area. For example, the amount billed may be compared with a predetermined amount previously set, and the YES determination may be made at step S220 when the amount billed is higher than or equal to the predetermined amount, and the NO determination may be made at step S220 when the amount billed is lower than the predetermined amount.

When the YES determination is made at step S220, that is, when bypass guidance is necessary, navigation controller 310 advances the process into step S230 to display a bypass retrieved at step S190 at step S190. At this stage, only a bypass that has the shortest bypass time may be guided, or guidance on a plurality of bypasses may be offered in a manner to permit user's selection.

When bypass guidance is unnecessary (when the NO determination is made at step S220), navigation controller 310 advances the process into step S140. That is, new route guidance in response to the prediction of passage through the road pricing area is not executed.

Although in the illustration of FIG. 5, the steps of guiding a route to the nearest charging station (S150 to S180) are executed preferentially over the steps of guiding a bypass (S190 to S220), the order of procedure may be changed such that the steps of guiding a bypass (S190 to S220) are executed first. In this case, when bypass guidance is unnecessary (when the NO determination is made at step S220), the steps of guiding a route to the nearest charging station (S150 to S180) are executed. Alternatively, the procedure may be changed such that either the steps of guiding a route to the nearest charging station (S150 to S180) or the steps of guiding a bypass (S190 to S220) are executed.

As described above, when passage through a road pricing area where vehicle traveling using the engine is subjected to billing is predicted, the navigation system and the hybrid vehicle with the same according to the present embodiment can appropriately determine whether or not the vehicle can pass through the road pricing area by EV traveling without being billed, based on the current state of charge of power storage device 216. Further, when passage by EV traveling is impossible, route guidance on the nearest charging facility (charging station) for charging an energy deficit and bypass guidance for avoiding passage through the road pricing area can be offered before passing through the road pricing area.

Particularly according to the overall route guidance control as shown in FIG. 5, the state of charge of power storage device 216, the bypass required time, the amount billed in the road pricing area, and the like are considered comprehensively, so that appropriate route guidance can be offered in relation to traveling in the road pricing area where an exhaust gas emission vehicle is subjected to billing. Further, optimum route guidance can also be automatically offered in accordance with threshold values previously set by the user (charge required time, bypass required time and amount billed).

Route guidance control of offering bypass guidance alone when passage through the road pricing area by EV traveling is impossible is not limited to externally rechargeable hybrid vehicles, but may also be applied to all hybrid vehicles capable of EV traveling.

It should be construed that embodiments disclosed herein are by way of illustration in all respects, not by way of limitation. It is intended that the scope of the present invention is defined by claims, not by the description above, and includes all modifications equivalent in meaning and scope to the claims.

INDUSTRIAL APPLICABILITY

The present invention is applicable to a navigation system for a hybrid vehicle.

The invention claimed is:

1. A navigation system for a hybrid vehicle including an internal combustion engine and a motor that outputs a vehicle driving force using electric power from a power storage device, said navigation system comprising:
 a prediction unit configured to predict in advance whether said hybrid vehicle will pass through a certain regulated area where vehicle traveling using said internal combustion engine is subjected to billing, based on vehicle position information and road map information;
 an acquisition unit configured to acquire a current state of charge (SOC) of said power storage device when passage through said regulated area is predicted;
 an estimation unit configured to estimate a required energy quantity (Wev) required to be output from said power storage device for passing through said regulated area in an electric traveling mode of traveling using the vehicle driving force from said motor with said internal combustion engine stopped, when passage through said regulated area is predicted;
 a determination unit configured to determine whether or not said hybrid vehicle can pass through said regulated area in said electric traveling mode, based on an estimated value of said required energy quantity estimated by said estimation unit and the current state of charge of said power storage device; and
 a search unit configured to execute route searching for avoiding billing in response to a determination by said determination unit that said hybrid vehicle cannot pass through said regulated area in said electric traveling mode, wherein said power storage device is configured to be rechargeable by a charging facility external to said hybrid vehicle, and said road map information contains information on said charging facility, and said search unit is configured to search for a route to an adjacent charging facility relative to a current position of said hybrid vehicle, as said route searching for avoiding billing.

2. The navigation system according to claim 1, further comprising:

an energy deficit calculation unit configured to calculate an energy deficit (AP) of said power storage device based on the estimated value of said required energy quantity estimated by said estimation unit and the state of charge of said power storage device, when said determination unit determines that said hybrid vehicle cannot pass through said regulated area in said electric traveling mode;

a charge time calculation unit configured to calculate a required charge time (Tch) for said energy deficit at said adjacent charging facility, based on said energy deficit as calculated and said road map information; and a guiding unit configured to offer guidance on a route to said adjacent charging facility retrieved by said search unit to a driver, when said required charge time as calculated is shorter than a predetermined time that can be set by a user.

3. The navigation system according to claim 2, wherein said search unit is configured to further search for a bypass for bypassing said regulated area based on said road map information, as said route searching for avoiding billing, when the guidance on the traveling route to said adjacent charging facility by said guiding unit is not executed, and said guiding unit is configured to offer guidance on said bypass retrieved by said search unit to the driver, when a required traveling time (Tbp) of said bypass is shorter than a predetermined time that can be set by a user.

4. The navigation system according to claim 1, wherein said search unit is configured to further search for a bypass for bypassing said regulated area based on said road map information, as said route searching for avoiding billing, said navigation system further comprising a guiding unit configured to offer guidance on said bypass retrieved by said search unit to a driver, when a required traveling time (Tbp) of said bypass is shorter than a predetermined time that can be set by a user.

5. The navigation system according to claim 4, said navigation system further comprising:

an energy deficit calculation unit configured to calculate an energy deficit (AP) of said power storage device based on the estimated value of said required energy quantity estimated by said estimation unit and the state of charge of said power storage device; and a charge time calculation unit configured to calculate a required charge time (Tch) for said energy deficit at said adjacent charging facility, based on said energy deficit as calculated and said road map information, wherein said guiding unit is configured to offer guidance on the route to said adjacent charging facility retrieved by said search unit to the driver, when said required charge time as calculated by said Charge time calculation unit is shorter than a predetermined time that can be set by the user.

6. The navigation system according to claim 1, wherein, when an amount billed by passage through said regulated area is lower than a predetermined amount that can be set by a user,
route guidance in accordance with said route searching for avoiding billing is not executed.

7. The navigation system according to claim 1, wherein said prediction unit is configured to predict whether said hybrid vehicle will pass through said regulated area, based on a result of searching for a route to a destination previously set.

8. The navigation system according to claim 1, wherein said prediction unit is configured to, during vehicle traveling with no destination set, predict whether said hybrid vehicle will pass through said regulated area, based on said vehicle position information and a past traveling history.

9. A hybrid vehicle comprising:

the navigation system as defined in claim 1;

said power storage device, said motor, said internal combustion engine; and a traveling controller configured to preferentially select said electric traveling mode during traveling in said regulated area.

10. A navigation system for a hybrid vehicle including an internal combustion engine and a motor that outputs a vehicle driving force using electric power from a power storage device, said navigation system comprising:

a prediction unit configured to predict in advance whether said hybrid vehicle will pass through a certain regulated area where vehicle traveling using said internal combustion engine is subjected to billing, based on vehicle position information and road map information;

an acquisition unit configured to acquire a current state of charge of said power storage device when passage through said regulated area is predicted;

an estimation unit configured to estimate a required energy quantity required to be output from said power storage device for passing through said regulated area in an electric traveling mode of traveling using the vehicle driving force from said motor with said internal combustion engine stopped, when passage through said regulated area is predicted;

a determination unit configured to determine whether or not said hybrid vehicle can pass through said regulated area in said electric traveling mode, based on an estimated value of said required energy quantity estimated by said estimation unit and the current state of charge of said power storage device; and a search unit configured to execute route searching for avoiding billing in response to a determination by said determination unit that said hybrid vehicle cannot pass through said regulated area in said electric traveling mode, wherein said search unit is configured to search for a bypass for bypassing said regulated area based on said road map information, as said route searching for avoiding billing, said navigation system further comprising a guiding unit configured to offer guidance on said bypass retrieved by said search unit to a driver when a required traveling time of said bypass is shorter than a predetermined time that can be set by a user, said power storage device being configured to be rechargeable by a charging facility external to said hybrid vehicle, and said road map information being configured to contain information on said charging facility, and said search unit is configured to search for a route to an adjacent charging facility relative to a current position of said hybrid vehicle, as said route searching for avoiding billing, when the guidance on said bypass by said guiding unit is not executed, said navigation system further comprising:
an energy deficit calculation unit configured to calculate an energy deficit of said power storage device based on the estimated value of said required energy quantity estimated by said estimation unit and the state of charge of said power storage device; and a charge time calculation unit configured to calculate a required charge time for said energy deficit at said adjacent charging facility, based on said energy deficit as calculated and said road map information.

* * * * *